United States Patent
Phan et al.

(10) Patent No.: US 11,859,461 B2
(45) Date of Patent: Jan. 2, 2024

(54) METAL TO METAL TUBULAR CONNECTION WITH CONTROLLED SUPPORT STRUCTURE

(71) Applicant: Halliburton Energy Services, Inc., Houston, TX (US)

(72) Inventors: Anthony Phan, Carrollton, TX (US); James Dan Vick, Jr., Carrollton, TX (US); Jason Lee Peacock, Carrollton, TX (US); Matthew Gassen, Carrollton, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/708,273

(22) Filed: Mar. 30, 2022

(65) Prior Publication Data
US 2023/0313634 A1    Oct. 5, 2023

(51) Int. Cl.
| F16J 15/10 | (2006.01) |
| E21B 33/12 | (2006.01) |
| E21B 33/04 | (2006.01) |
| F16J 15/08 | (2006.01) |
| E21B 33/126 | (2006.01) |

(52) U.S. Cl.
CPC .......... *E21B 33/1212* (2013.01); *E21B 33/04* (2013.01); *E21B 33/1265* (2013.01); *F16J 15/0881* (2013.01); *F16J 15/102* (2013.01); *E21B 2200/01* (2020.05)

(58) Field of Classification Search
CPC ...... E21B 33/12; E21B 33/04; E21B 33/1265; E21B 2200/01; F16J 15/08; F16J 15/0881; F16J 15/102; F16J 15/26; F16J 15/28
See application file for complete search history.

(56) References Cited

U.S. PATENT DOCUMENTS

| 2,239,942 | A | 4/1941 | Stone et al. |
| 4,009,893 | A | 3/1977 | Schatton et al. |
| 5,067,734 | A | 11/1991 | Boehm, Jr. |
| 5,211,226 | A | 5/1993 | Hendrickson et al. |
| 9,719,318 | B2 | 8/2017 | Haake et al. |
| 10,844,687 | B2 | 11/2020 | Rodela et al. |
| 2004/0145492 | A1* | 7/2004 | Hall ............ E21B 47/13 340/854.3 |
| 2004/0164833 | A1* | 8/2004 | Hall ............ E21B 47/13 336/132 |
| 2004/0164838 | A1* | 8/2004 | Hall ............ F16L 25/01 336/234 |

(Continued)

FOREIGN PATENT DOCUMENTS

| JP | 59-083887 A | 5/1984 |
| WO | 2013093233 A1 | 6/2013 |

OTHER PUBLICATIONS

Translation of JPS583887A, Jul. 28, 2023.*
International Search Report and Written Opinion for PCT/US2022/025538 dated Dec. 28, 2022.

*Primary Examiner* — Gilbert Y Lee
(74) *Attorney, Agent, or Firm* — Scott Richardson; C. Tumey Law Group PLLC

(57) ABSTRACT

Systems of the present disclosure relate to metal-to-metal seals for oilfield tubulars. A pin for a metal-to-metal seal, comprises a pin nose and a support structure. A gap extends between the pin nose and the support structure.

18 Claims, 5 Drawing Sheets

(56) References Cited

U.S. PATENT DOCUMENTS

| | | | |
|---|---|---|---|
| 2006/0016590 A1* | 1/2006 | Hall | E21B 17/028 |
| | | | 166/242.6 |
| 2007/0170722 A1 | 7/2007 | Reynolds, Jr. et al. | |
| 2010/0116489 A1 | 5/2010 | Nelson | |
| 2010/0264646 A1* | 10/2010 | Follini | E21B 17/003 |
| | | | 285/119 |
| 2011/0174482 A1 | 7/2011 | Verger et al. | |
| 2018/0252343 A1* | 9/2018 | Evans | F16L 15/001 |

* cited by examiner

METAL TO METAL TUBULAR CONNECTION WITH CONTROLLED SUPPORT STRUCTURE

BACKGROUND

In design standard and technical applications for metal-to-metal (MTM) sealing thread connections, the pin nose cross-section remains the same for all tubing sizes. In applications where external pressure exceeds the stiffness of the cross-sectional area, excessive hoop deflection during collapse causes the pin nose to yield.

Various finite element analysis (FEA) simulations have displayed this limitation. Therefore, there is a leakage risk upon cyclic loading, especially with pressure reversals. Current pin nose is self-supporting solely by its material stiffness and geometry. Design modification of the current pin nose geometry has not shown to provide sufficient support.

BRIEF DESCRIPTION OF THE DRAWINGS

These drawings illustrate certain aspects of some of the examples of the present disclosure and should not be used to limit or define the disclosure.

DETAILED DESCRIPTION

Systems of the present disclosure generally relate to an insert of lower yielded material that is installed underneath a pin nose. This provides an active support structure to bridge any gap between the pin nose to an underlying/lower support structure. The pin nose may also be supported by its underlying support structure without the insert. The gap between the pin nose and the underlying support structure is calculated and machined exactly such as when the two tubulars are fully mated, the pin nose contacts the underlying support structure.

The enhanced connection is created via a soft insert or with a controlled gap which improves the pin's sealing performance in high pressure applications by providing additional support via the underlying support structure. This is an active support design which bridges the pin nose to the underlying support structure.

The pin nose enhancement of the present disclosure expands the use case of existing metal-to-metal thread connections for applications in high pressure/high temperature scenarios. Due to a reduced wall stiffness/thickness limitation, pins of the present disclosure may include sections with reduced thicknesses allowing for slim applications.

In order to prevent local yielding of the pin nose, the insert is designed with underlying yield-strength metallic materials such as, for example: inconel, stainless steel, brass, aluminum, aluminum bronze, or combinations thereof. Upon external collapse pressure, any deflection of the pin nose is supported by the underlying support. This design converts the pin nose from a cantilever type to a cantilever that is supported.

The stiffness of the nose pin (cantilever) and contact stress is also distributed throughout the metal-to-metal sealing location. With added collapse pressure, the metal-to-metal contact pressure increases, thereby providing for more positive seal assurance. The insert may also be made of thermoplastic (e.g., PEEK, PTFE, PPS) and/or thermoset (e.g., epoxy, silicone, phenolic). The insert may also be made of elastomers (e.g., NBR, HNBR, FKM).

The insert may also include a linear wave spring with sufficient spring force to support the pin nose. In some examples, the gap may be filled with a filler material. In other examples, the insert may be of a lattice structure (e.g., wire mesh with fillers).

In some examples, a controlled gap between the pin and its underlying support may be used with the insert. The gap may be made by a manufacturing technique such as electric discharge machining (EDM). The gap between the pin nose and the insert allows for tubulars to be connected with either a controlled interference or no interference at all.

In other examples, a void capacity underneath the pin may be fluid filled (gas or liquid) and closed off during assembly. As the pin is deployed downhole, temperature increase causes an expansion of the charged fluid thereby energizing the seal.

Figure 1:
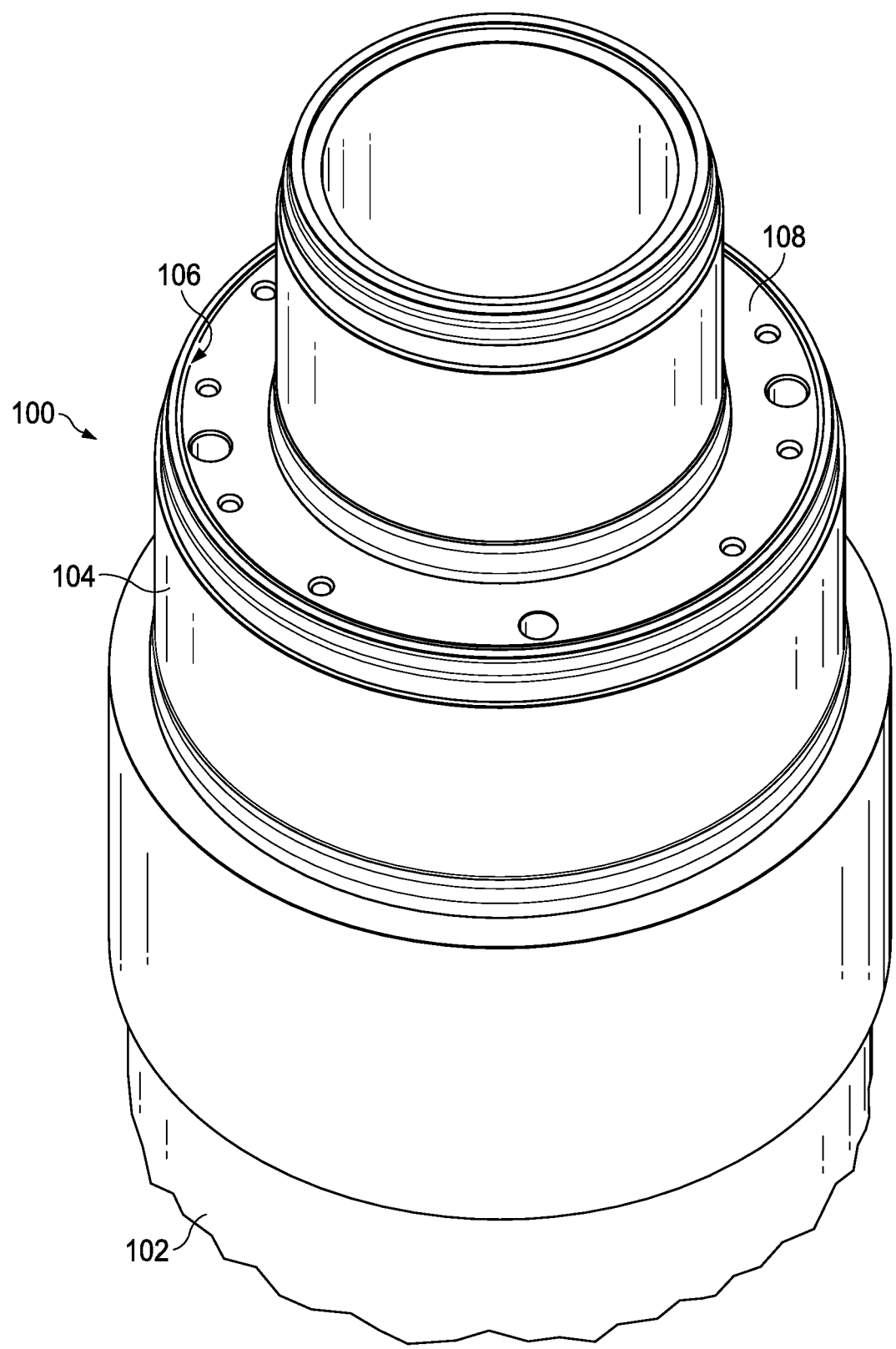
FIG. 1 illustrates a pin for a metal-to-metal connection for a downhole tubular, in accordance with examples of the present disclosure.

FIG. 1 illustrates a pin 100 for a metal-to-metal connection for an oilfield tubular, in accordance with examples of the present disclosure. The pin 100 may be disposed on a distal end of an oilfield tubular 102 such as a tool or piping for disposal into a subterranean formation for exploration and/or production operations (hydrocarbon recovery), for example. The pin 100 may include a pin nose 104 for insertion into a box during mating of the pin to the box.

A gap 106 may be disposed between the pin nose 104 and an underlying support structure 108 of the pin 100. The underlying support structure 108 may be positioned radially inward from the pin nose 104. For example, an outer diameter of the underlying support structure 108 is less than the inner diameter of the pin nose 104. The underlying support structure 108 and the pin nose 104 may be coaxially and/or concentrically aligned and may each be of a tubular shape, as shown, for example.

The gap 106 may extend along a circumference of the underlying support structure 108. The gap 106 between the pin nose and the underlying support structure 108 is calculated and machined exactly such as when two tubulars (e.g., a pin and a box) are fully mated, the pin nose 104 contacts the underlying support structure 108. Upon external collapse pressure, any deflection of the pin nose 104 is supported by the underlying support structure 108.

The gap 106 may be created by a manufacturing technique such as electric discharge machining (EDM). The gap 106 between the pin nose 104 and an insert allows for body joints to be made up with either a controlled interference or no interference at all. A size or thickness of the gap 106 may range, for example, from about 0.005 to 0.500 inches.

Figure 2A:
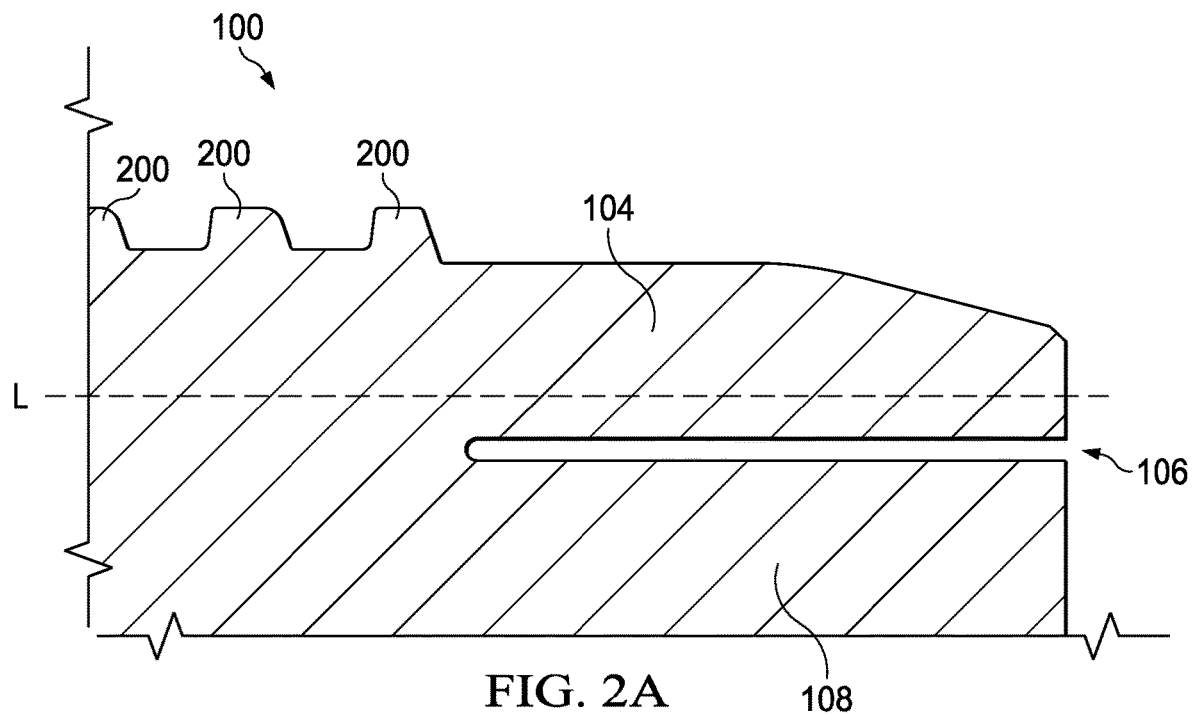
FIG. 2A illustrates a cross-section of the pin, in accordance with examples of the present disclosure.

FIG. 2A illustrates a cross-section of the pin 100, in accordance with examples of the present disclosure. The pin 100 may include threads 200 for mating with a box resulting in a metal-to-metal seal therebetween. The pin nose 104 is illustrated in a non-deflected position state and does not bend toward the underlying support structure 108, thereby leaving the gap 106 in an unaltered state.

The gap 106 may extend in a direction along a longitudinal axis L of the pin nose 104. In some examples, the gap 106 may extend beneath the pin nose 104 along the entire length of the pin nose 104. In other examples, the gap 106 may extend along L, beneath a portion of the pin nose 104. In some examples, the gap 106 may extend beneath the pin nose 104 along L, from a non-threaded section of the pin 100 to a distal end of the pin 100. In some examples, a range for a length (in a direction along L) of the gap 106 may range from about 0.100 to 2.00 inches.

A controlled gap improves the pin's sealing performance in high pressure applications by providing additional support from the underlying support structure 108. The gap 106 between the pin nose 104 and the underlying support 108 is calculated and machined exactly such that when the two tubulars are fully mated, the pin nose 104 contacts the underlying support structure 108.

Figure 2B:
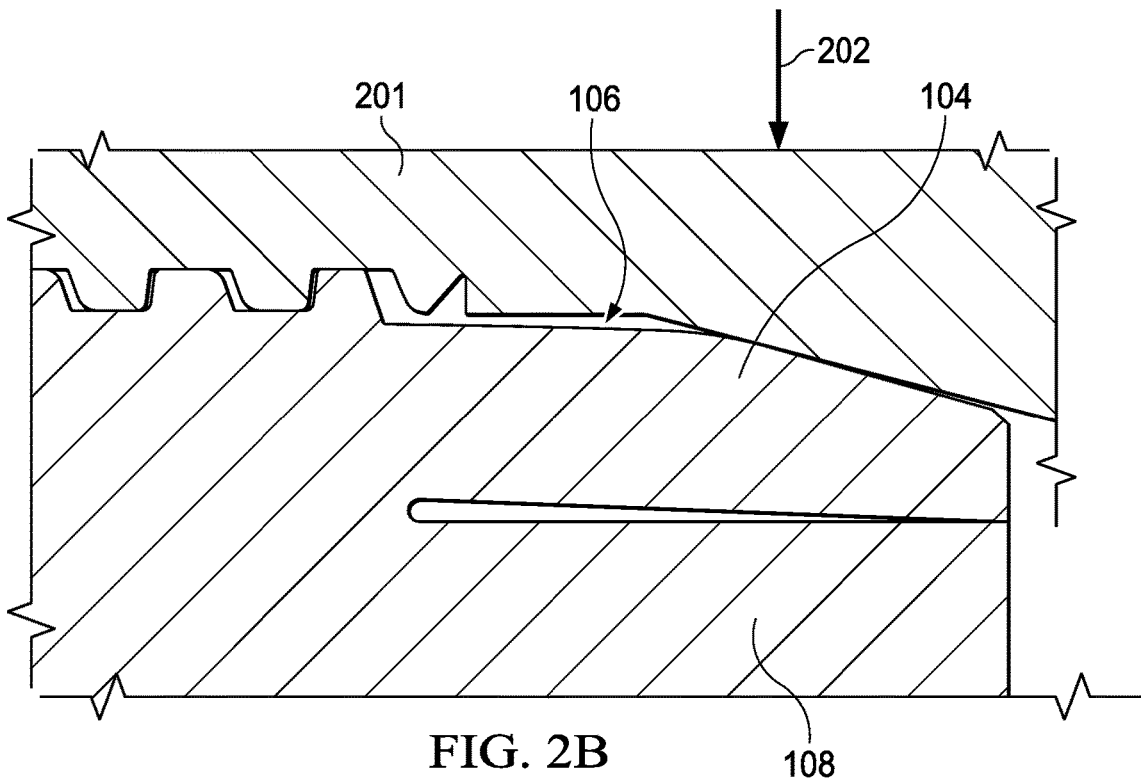
FIG. 2B illustrates a cross-section of the pin mated to a box, in accordance with examples of the present disclosure.

FIG. 2B illustrates a cross-section of the pin 100 mated to a box 201, in accordance with examples of the present disclosure. The box 201 may be a portion of another oilfield tubular. As an external force 202 is applied to the pin nose 104 via the box 201, the pin nose 104 may bend toward and/or contact the underlying support structure 108 to provide an improved fluid seal for the threaded connection between the pin 100 and the box 201. The pin nose 104 is illustrated in a compressed state, resulting in the gap 106 being altered to support the pin nose 104. The gap 106 allows gradual deflection/bending of the pin nose 104 in a controlled manner.

Figure 3A:
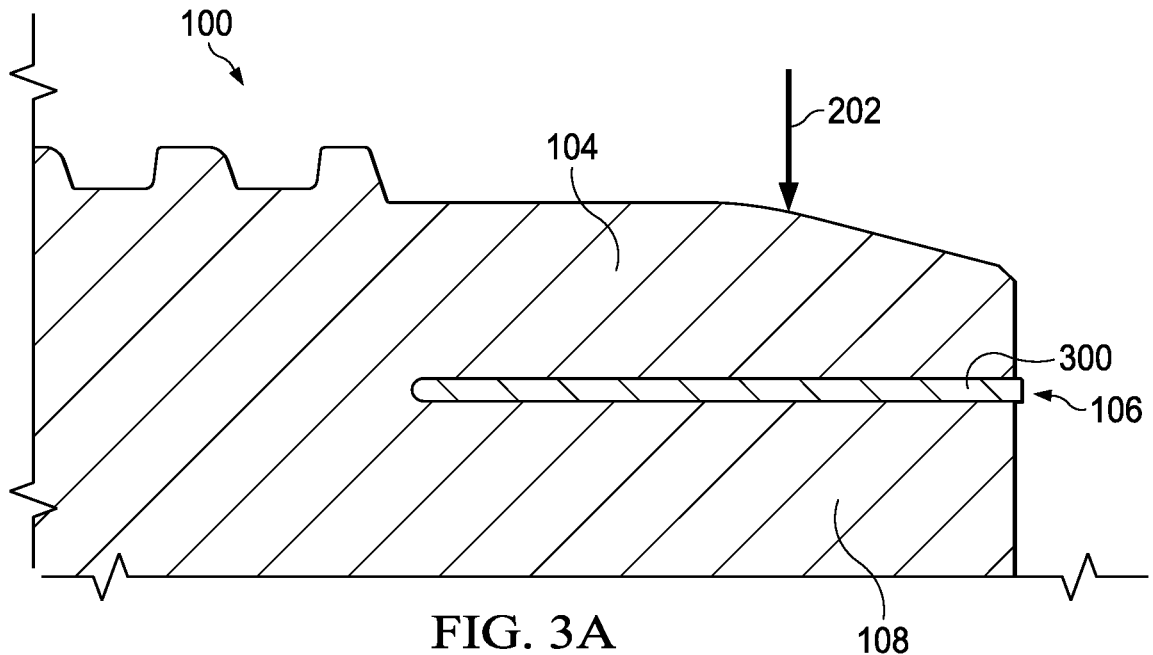
FIG. 3A illustrates a cross-section of the pin with an insert, in accordance with examples of the present disclosure.

FIG. 3A illustrates a cross-section of the pin 100 with an insert 300, in accordance with examples of the present disclosure. The insert 300 may be disposed in the gap 106 to prevent or mitigate deflection of the pin nose 104 during exposure to an external pressure 202. In some examples, the insert 300 may completely fill the gap 106.

The insert 300 is designed with lower yield-strength metallic materials such as, for example: inconel, stainless steel, brass, aluminum, aluminum bronze, or combinations thereof. Upon external collapse pressure, any deflection of the pin nose 104 is supported by the underlying support structure 108. This design converts the pin nose 104 from a cantilever type to a cantilever that is supported.

In some examples, the insert 300 may be made of thermoplastic (e.g., PEEK, PTFE, PPS) and thermoset (e.g., epoxy, silicone, phenolic). In other examples, the insert 300 may be made of elastomers (e.g., NBR, HNBR, FKM). The pin nose stiffness and contact stress is also distributed throughout the metal-to-metal sealing location. With added collapse pressure, the metal-to-metal contact pressure increases, thereby providing for more positive seal assurance.

Figure 3B:
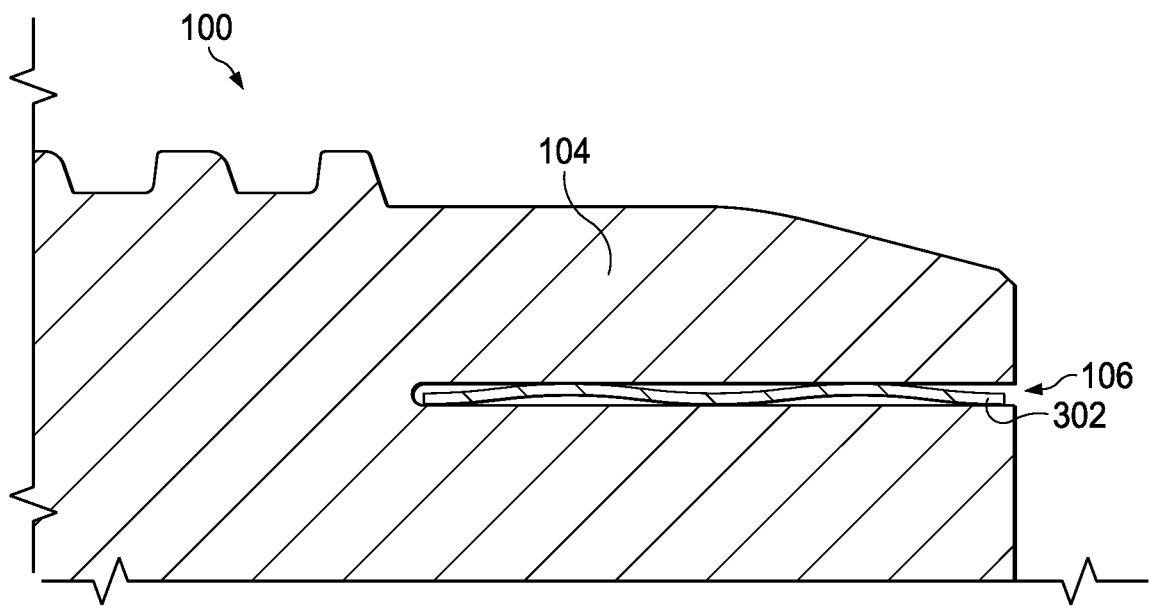
FIG. 3B illustrates a cross-section of the pin with a linear wave spring, in accordance with examples of the present disclosure.

FIG. 3B illustrates a cross-section of the pin 100 with a linear wave spring 302 used as an insert, in accordance with examples of the present disclosure. The linear wave spring 302 may be disposed in the gap 106. The linear wave spring 302 includes sufficient spring force to support the pin nose 104. In some examples, the linear wave spring 302 may completely or substantially fill the gap 106.

Figure 3C:
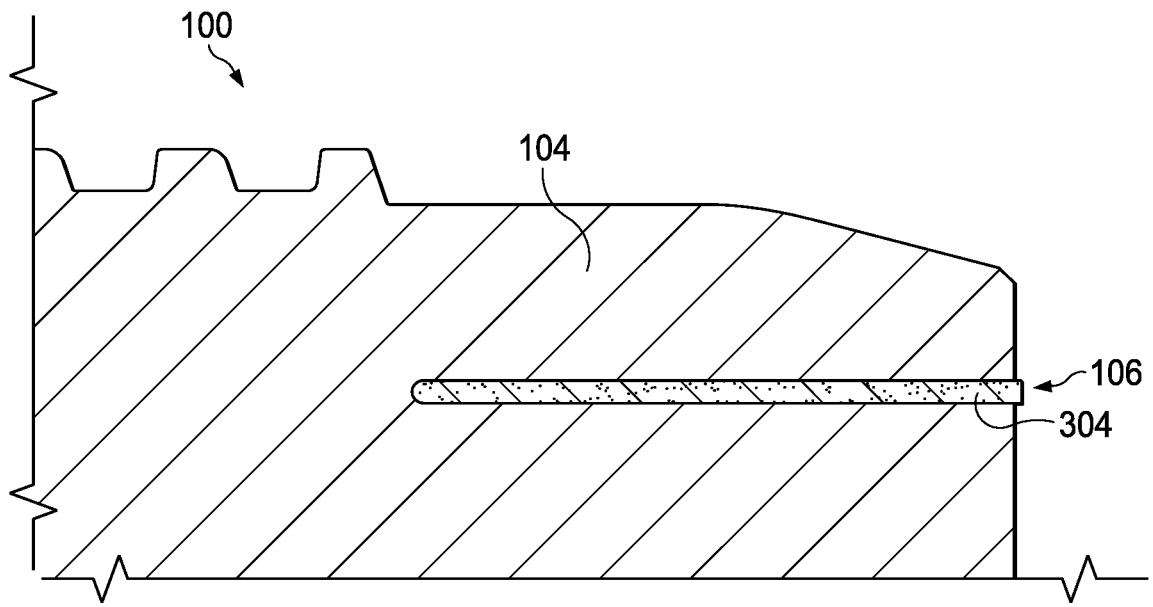
FIG. 3C illustrates a cross-section of the pin with a filler material, in accordance with examples of the present disclosure.

FIG. 3C illustrates a cross-section of the pin 100 with a filler material 304, in accordance with examples of the present disclosure. The gap 106 may be filled with a filler material 304 such as for example an expandable alloy. As the alloy contacts downhole fluids, an expansion reaction occurs which energizes the metal-to-metal seal. The filler material 304 may support the pin nose 104. In some examples, the filler 304 may completely or substantially fill the gap 106.

Figure 3D:
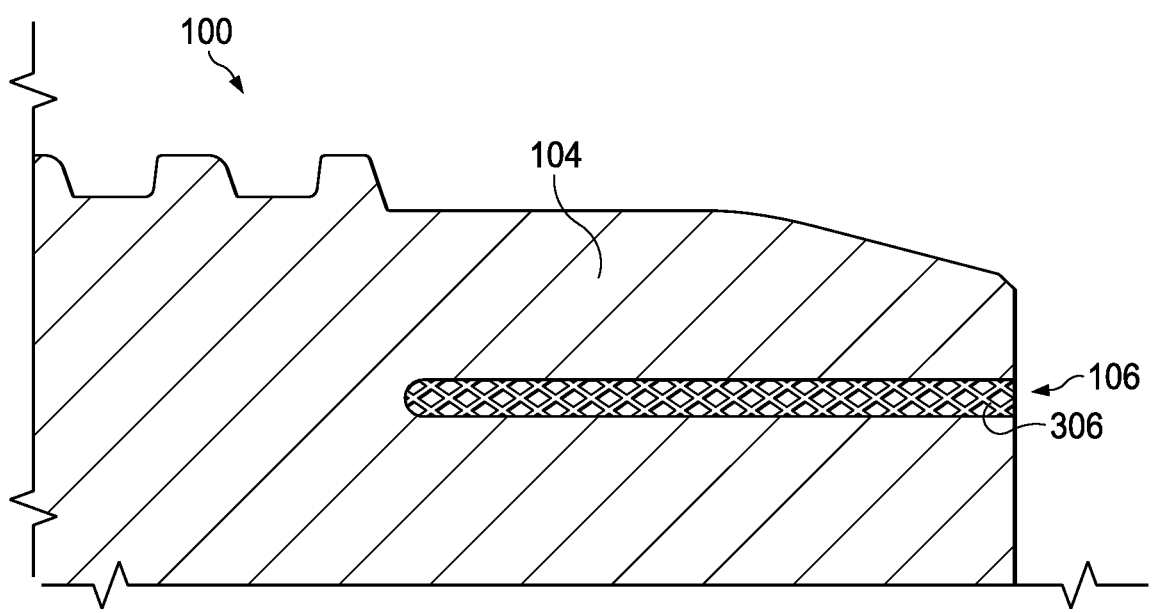
FIG. 3D illustrates a cross-section of the pin with a lattice structure, in accordance with examples of the present disclosure.

FIG. 3D illustrates a cross-section of the pin 100 with a lattice structure 306, in accordance with examples of the present disclosure. The gap 106 may be filled with the lattice structure 306 (e.g., wire mesh with fillers). The lattice structure 306 may support the pin nose 104. In some examples, the lattice structure 306 may completely or substantially fill the gap 106.

Figure 3E:
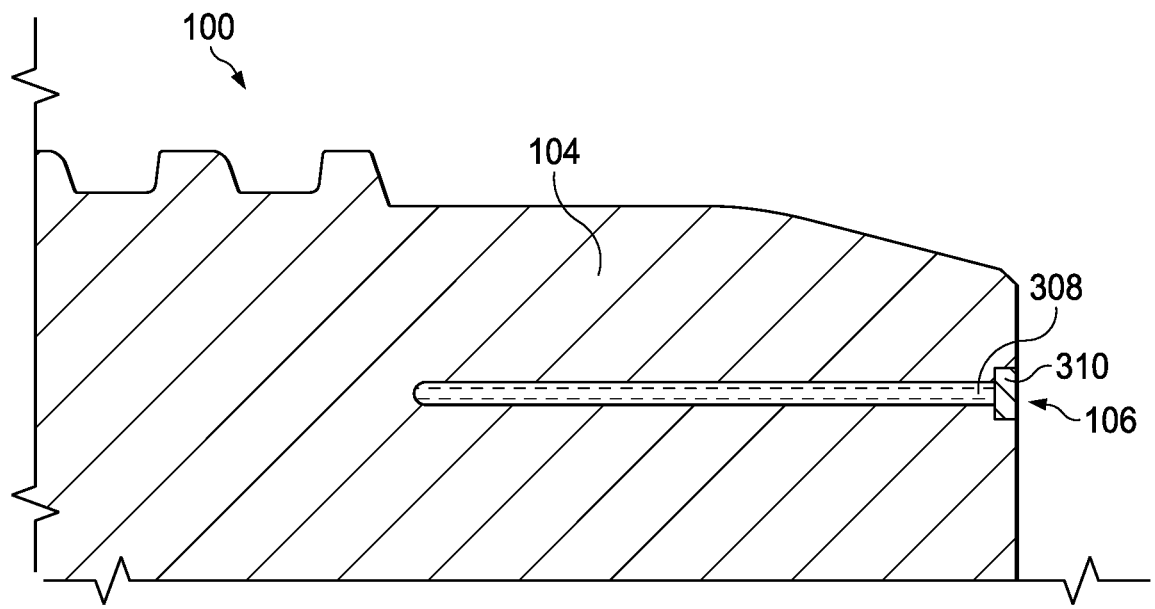
FIG. 3E illustrates a cross-section of the pin with a fluid-filled gap, in accordance with examples of the present disclosure.

FIG. 3E illustrates a cross-section of the pin 100 with a void capacity 308, in accordance with examples of the present disclosure. A void capacity 308 underneath the pin may be fluid filled (gas or liquid) and closed off/sealed during assembly via a plug 310, for example. As the pin is deployed downhole, temperature increase causes an expansion of the charged fluid thereby energizing (e.g., actuating, expanding) the metal-to-metal seal.

Accordingly, the systems of the present disclosure improve sealing for metal-to-metal connections for oilfield tubulars. The systems may include any of the various features disclosed herein, including one or more of the following statements.

Statement 1. An oilfield tubular comprising a pin for a metal-to-metal seal, the pin comprising a pin nose and a support structure, wherein a gap extends between the pin nose and the support structure.

Statement 2. The oilfield tubular of the statement 1, wherein the gap extends along a circumference of the support structure.

Statement 3. The oilfield tubular of any of the preceding statements, wherein the gap is operable to close due to deflection of the pin nose toward the support structure.

Statement 4. The oilfield tubular of any of the preceding statements, further comprising an insert disposed in the gap.

Statement 5. The oilfield tubular of any of the preceding statements, further comprising a spring disposed in the gap.

Statement 6. The oilfield tubular of any of the preceding statements, further comprising a filler material in the gap.

Statement 7. The oilfield tubular of any of the preceding statements, further comprising a fluid sealed in the gap.

Statement 8. The oilfield tubular of any of the preceding statements, further comprising an insert disposed in the gap, the insert comprising inconel, stainless steel, brass, aluminum, aluminum bronze, or combinations thereof.

Statement 9. The oilfield tubular of any of the preceding statements, further comprising an insert disposed in the gap, the insert comprising thermoplastic and/or thermoset.

Statement 10. The oilfield tubular of any of the preceding statements, further comprising an insert disposed in the gap, the insert comprising an elastomer.

Statement 11. A pin for a metal-to-metal seal, the pin comprising a pin nose and a support structure, wherein a gap extends between the pin nose and the support structure.

Statement 12. The pin of the statement 11, wherein the step of coating comprises coating the resin onto the proppant in a frac tub during a fracking operation.

Statement 13. The pin of the statement 11 or the statement 12, wherein the step of coating comprises coating the resin onto the proppant that is positioned on a sand screw during a fracking operation.

Statement 14. The pin of any of the statements 11-13, further comprising an insert disposed in the gap.

Statement 15. The pin of any of the statements 11-14, further comprising a spring disposed in the gap.

Statement 16. The pin of any of the statements 11-15, further comprising a filler material in the gap.

Statement 17. The pin of any of the statements 11-16, further comprising a fluid sealed in the gap.

Statement 18. The pin of any of the statements 11-17, further comprising an insert disposed in the gap, the insert comprising inconel, stainless steel, brass, aluminum, aluminum bronze, or combinations thereof.

Statement 19. The pin of any of the statements 11-18, further comprising an insert disposed in the gap, the insert comprising thermoplastic and/or thermoset.

Statement 20. The pin of any of the statements 11-19, further comprising an insert disposed in the gap, the insert comprising an elastomer.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. An oilfield tubular comprising:
   a pin adapted for a metal-to-metal seal, wherein the pin comprises:
   a support structure;
   a pin nose;
   a gap extending between the pin nose and the support structure along a longitudinal axis of the pin, wherein the longitudinal axis is orthogonal to a circumference of the pin; and
   an insert, disposed in the gap, adapted to prevent the pin nose from contacting the support structure, wherein the insert is inserted in the longitudinal direction.

2. The oilfield tubular of claim 1, wherein the gap extends along the circumference.

3. The oilfield tubular of claim 1, wherein the insert includes a thermoset.

4. The oilfield tubular of claim 1, further comprising a spring disposed in the gap.

5. The oilfield tubular of claim 1, further comprising a filler material in the gap.

6. The oilfield tubular of claim 1, further comprising a fluid sealed in the gap.

7. The oilfield tubular of claim 1, wherein the insert includes inconel, stainless steel, brass, aluminum, aluminum bronze, or combinations thereof.

8. The oilfield tubular of claim 1, wherein the insert comprises a thermoplastic.

9. The oilfield tubular of claim 1, wherein the insert includes an elastomer.

10. A pin adapted for a metal-to-metal seal, wherein the pin comprises:
    a support structure;
    a pin nose;
    a gap extending between the pin nose and the support structure along a longitudinal axis of the pin, wherein the longitudinal axis is orthogonal to a circumference of the pin; and
    an insert, disposed in the gap, adapted to prevent the pin nose from contacting the support structure, wherein the insert is inserted in the longitudinal direction.

11. The pin of claim 10, wherein the gap extends along the circumference.

12. The pin of claim 10, wherein the insert includes a thermoset.

13. The pin of claim 10, further comprising a spring disposed in the gap.

14. The pin of claim 10, further comprising a filler material in the gap.

15. The pin of claim 10, further comprising a fluid sealed in the gap.

16. The pin of claim 10, wherein the insert includes inconel, stainless steel, brass, aluminum, aluminum bronze, or combinations thereof.

17. The pin of claim 10, wherein the insert includes a thermoplastic.

18. The pin of claim 10, wherein the insert includes an elastomer.

* * * * *